United States Patent
Toso et al.

(10) Patent No.: US 12,060,956 B2
(45) Date of Patent: Aug. 13, 2024

(54) CONNECTOR FOR PIPELINES AND METHOD TO CONNECT THE CONNECTOR TO A PIPELINE

(71) Applicant: SAIPEM S.P.A., San Donato Milanese (IT)

(72) Inventors: Gianluca Toso, San Donato Milanese (IT); Riccardo Mattarucco, San Donato Milanese (IT); Sebastiano Guadin, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 398 days.

(21) Appl. No.: 17/293,379

(22) PCT Filed: Nov. 22, 2019

(86) PCT No.: PCT/IB2019/060063
§ 371 (c)(1),
(2) Date: May 12, 2021

(87) PCT Pub. No.: WO2020/105004
PCT Pub. Date: May 28, 2020

(65) Prior Publication Data
US 2022/0010900 A1    Jan. 13, 2022

(30) Foreign Application Priority Data

Nov. 22, 2018 (IT) .................. 102018000010510

(51) Int. Cl.
*F16L 23/20* (2006.01)
*F16L 23/024* (2006.01)
(Continued)

(52) U.S. Cl.
CPC .......... *F16L 23/167* (2013.01); *F16L 23/024* (2013.01); *F16L 23/036* (2013.01); *F16L 23/20* (2013.01);
(Continued)

(58) Field of Classification Search
CPC . F16L 1/26; F16L 23/20; F16L 23/167; F16L 23/024; E21B 17/04; E21B 17/02; E21B 43/0107; E21B 43/013
See application file for complete search history.

(56) References Cited

U.S. PATENT DOCUMENTS

| | | | |
|---|---|---|---|
| 4,078,832 A | 3/1978 | Wittman | |
| 4,133,558 A * | 1/1979 | Ahlstone | F16L 27/073 285/379 |

(Continued)

FOREIGN PATENT DOCUMENTS

| | | |
|---|---|---|
| EP | 0 461 819 A2 | 12/1991 |
| EP | 0 802 002 | 10/1997 |

(Continued)

OTHER PUBLICATIONS

Notification Concerning Submission, Obtention or Transmittal of Priority Document for International Application No. PCT/IB2019/060063 dated Feb. 27, 2020.

(Continued)

*Primary Examiner* — Zachary T Dragicevich
*Assistant Examiner* — James A Linford
(74) *Attorney, Agent, or Firm* — Neal, Gerber & Eisenberg LLP

(57) ABSTRACT

A connector for a pipeline, in particular for conveying hydrocarbons, extends along a longitudinal axis and has a gripping portion configured to be fitted around and clamped to the outer face; a sleeve portion, which is mounted in sliding manner to the gripping portion; a metal front gasket (Continued)

configured to be placed between the front end face and a face of the sleeve portion; and linear actuators connected with the gripping portion and the sleeve portion to axially compress the metal front gasket between the front end face of the pipeline and the face of the sleeve portion.

8 Claims, 6 Drawing Sheets

(51) Int. Cl.
    *F16L 23/036*     (2006.01)
    *F16L 23/16*     (2006.01)
    *F16L 58/08*     (2006.01)
    *F16L 58/18*     (2006.01)

(52) U.S. Cl.
    CPC ............. *F16L 58/08* (2013.01); *F16L 58/187* (2013.01); *F16L 2201/30* (2013.01)

(56) References Cited

U.S. PATENT DOCUMENTS

| | | | |
|---|---|---|---|
| 4,218,067 A * | 8/1980 | Halling | F16J 15/021 |
| | | | 277/645 |
| 4,330,143 A | 5/1982 | Reneau | |
| 5,590,913 A | 1/1997 | Morris et al. | |
| 6,113,157 A * | 9/2000 | Wilkins | F16L 27/053 |
| | | | 285/263 |
| 6,433,067 B2 | 8/2002 | Mercuri et al. | |
| 2005/0258642 A1* | 11/2005 | Brophy, III | F16L 23/032 |
| | | | 285/223 |
| 2009/0160184 A1* | 6/2009 | Vo | F16L 23/024 |
| | | | 285/249 |
| 2017/0276269 A1 | 9/2017 | Tromans | |

FOREIGN PATENT DOCUMENTS

| | | |
|---|---|---|
| GB | 1 596 794 | 8/1981 |
| WO | WO 2014/152904 A1 | 9/2014 |
| WO | WO 2018/044178 A1 | 3/2018 |

OTHER PUBLICATIONS

International Search Report and Written Opinion for International Application No. PCT/IB2019/060063 dated Apr. 15, 2020.
PCT Direct letter attached to the International Patent Application claiming the priority of patent application No. 102018000010510 filed on Nov. 22, 2018, dated Nov. 20, 2019.
European Office Action for Application No. 19 823 884.2 dated Oct. 13, 2023 (5 pages).

* cited by examiner

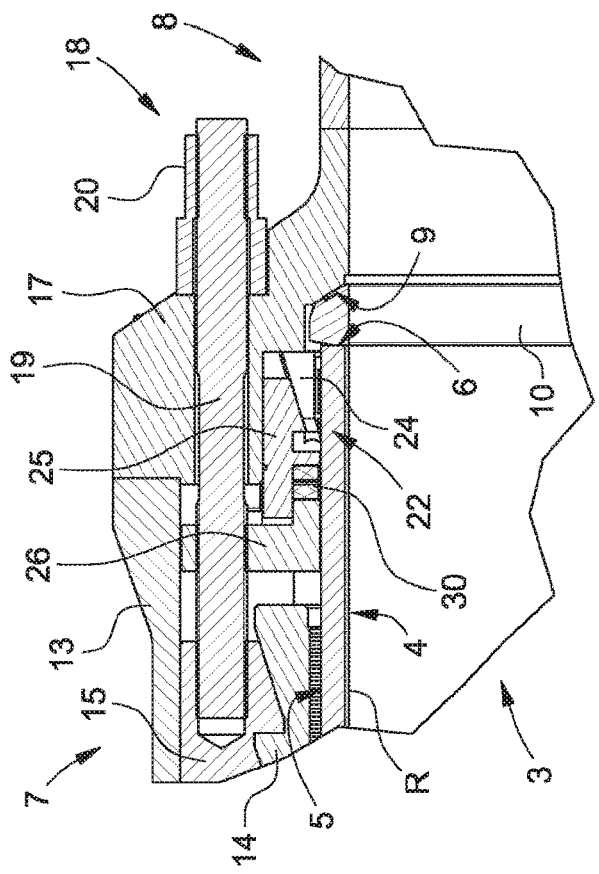
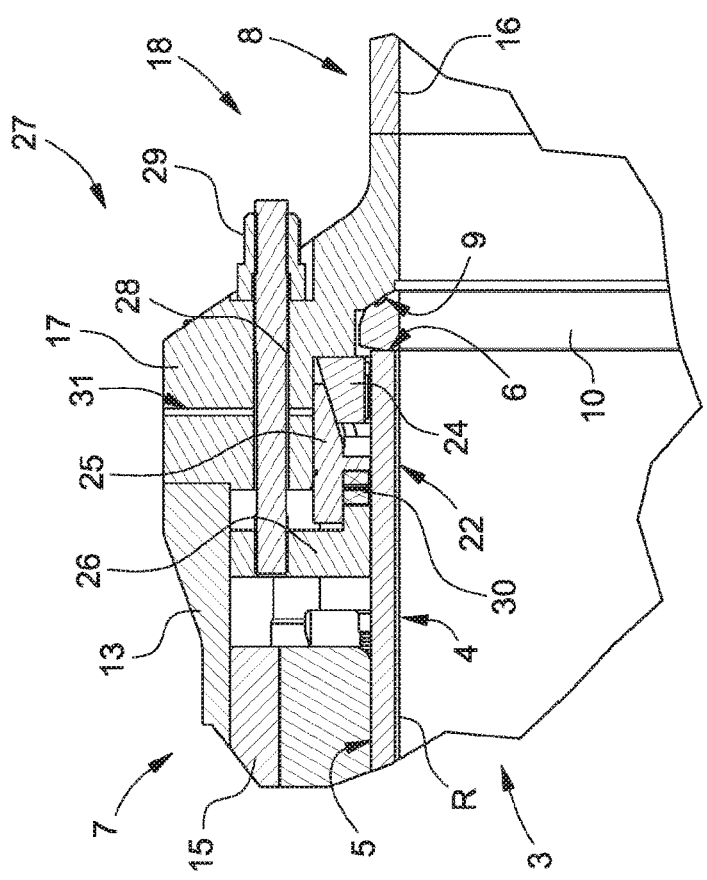
FIG. 5
FIG. 4

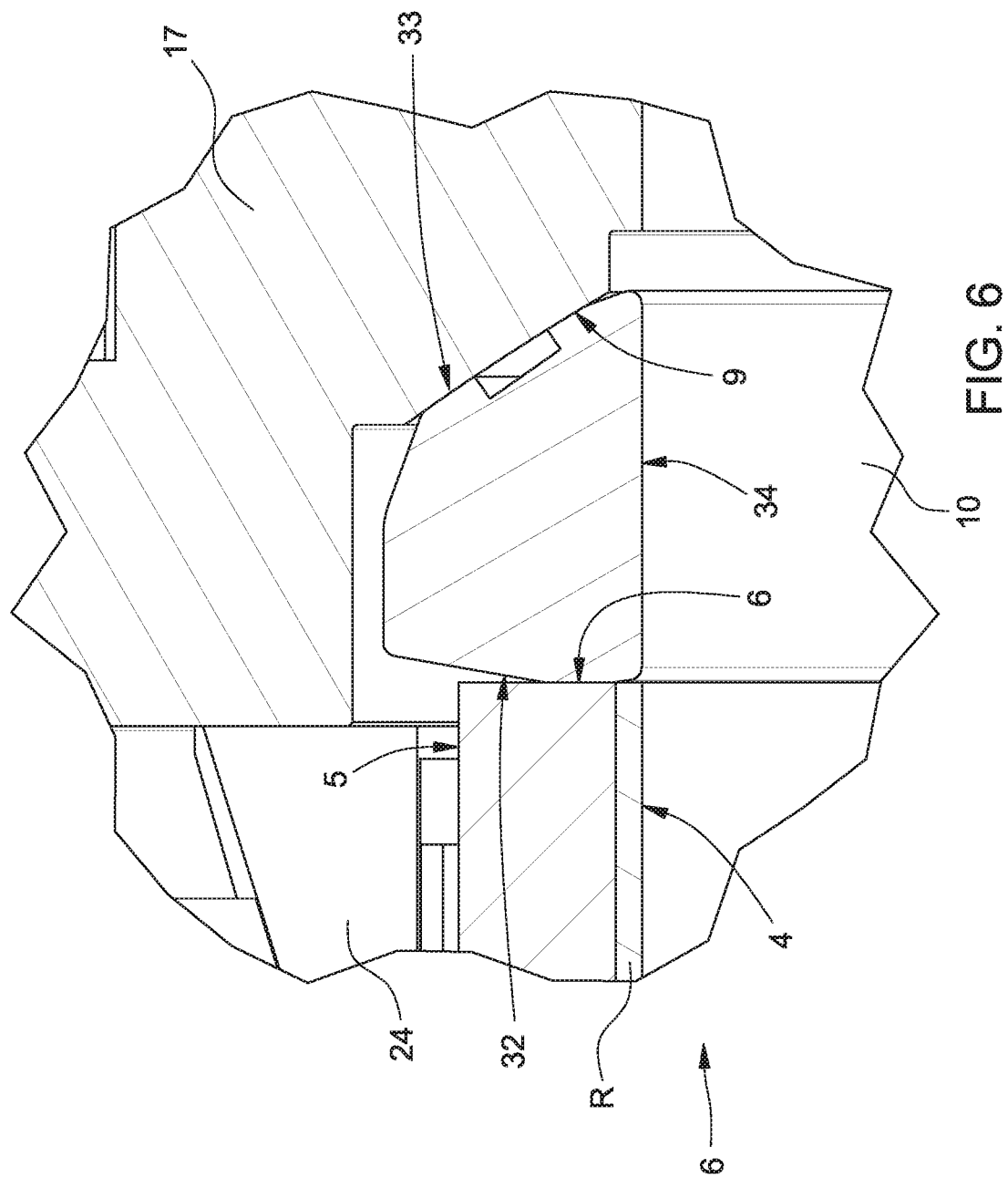

CONNECTOR FOR PIPELINES AND METHOD TO CONNECT THE CONNECTOR TO A PIPELINE

PRIORITY CLAIM

This application is a national stage application of PCT/IB2019/060063, filed on Nov. 22, 2019, which claims the benefit of and priority to Italian Patent Application No. 102018000010510, filed on Nov. 22, 2018, the entire contents of which are each incorporated by reference herein.

TECHNICAL FIELD

This disclosure concerns a connector for a pipeline, in particular for the transport of hydrocarbons.

BACKGROUND

In practice, a connector for pipelines is joined to one free end of a pipeline. In particular, it is necessary to join a connector to a free end of a pipeline to repair the damaged pipeline. In this case, it is necessary to ensure maximum airtight sealing between the connector and the pipeline in order to avoid hydrocarbon leaks.

Several patent documents concern connection systems based on different principles such as, for example, EP 461,819, U.S. Patent Application Publication No. 2017/276, 269, U.S. Pat. Nos. 6,433,067, 4,078,832, 5,590,913, EP 802,002, and U.S. Pat. No. 4,330,143.

In particular, U.S. Pat. No. 4,330,143 describes an apparatus for connecting two pipelines comprising a first and a second tubular portion that move axially with each other by means of axial movement means, and an annular gasket placed between the first and the second tubular portion.

Further critical issues in joining connectors to pipelines derive from the fact that hydrocarbons can be corrosive and, therefore, damage parts of the pipeline that are not adequately protected. In the petrochemical sector, it is known to convey corrosive fluids such as, for example, hydrocarbons with a high content of sulphides and/or carbon dioxide along metal pipelines. The pipelines designed to convey corrosive fluids must guarantee, in addition to their relatively high mechanical properties, a relatively high resistance to corrosion and, for this purpose, have a metal wall covered, along the inner face, with a coating made of metal alloys that is designed to withstand corrosive agents and joined to the wall with a metallurgical bond (cladding) or with a mechanical bond (lining). In some cases, the pipelines have an extra thickness.

Cladded or lined pipelines with the above-mentioned metal alloys withstand the aggressiveness of corrosive fluids. However, the protection provided by the coating may come away when one end of the pipeline is joined to a connector. One of the identified issues is that the free end of the pipeline has a front end wall and an outer wall that are not protected by the coating.

To overcome this drawback, the applicant has proposed, in patent EP 3,110,575 B1, a solution aimed at shielding the front face as well, so that it is not placed, in use, in contact with the hydrocarbons or, more generally, with corrosive fluids. This technical solution has proven to be effective but requires an expandable mandrel for each pipeline diameter.

Also for internally coated pipes, a connector with a double front and circumferential seal was proposed in PCT Patent Application No. WO2014152904. In particular, it consists of an assembly made up of a primary gasket that extrudes when closing, frontally sealing the inner corner of the pipe, guided by a dedicated profile. However, this solution has the disadvantage of not being able to control the actual course of the extrusion.

SUMMARY

One of the purposes of this disclosure is to provide a connector for a pipeline capable of ensuring an effective hydraulic seal.

According to this disclosure, a connector for a pipeline is provided, in particular a pipeline for conveying hydrocarbons, wherein the pipeline has an inner face, an outer face and a front end face; the connector extending along a longitudinal axis and comprising a gripping portion configured to be fitted around and clamped to the outer face; a sleeve portion, which is mounted in sliding manner to the gripping portion, and has a face facing the front end face when the gripping portion is fitted around the pipeline; a metal front gasket configured to be placed between the front end face and the face of the sleeve portion and comprising a face configured to make a shape-coupling with the face of the sleeve portion, wherein the face of the metal front gasket and the face of the sleeve portion form a spherical coupling; and linear actuators connected with the gripping portion and the sleeve portion to axially compress the metal front gasket between the front end face of the pipeline and the face of the sleeve portion. In this way, the axial compression determines a front contact zone between the front face of the pipeline and the metal front gasket with possible penetration between the metal front gasket and the end of the pipeline to ensure a relatively high hydraulic seal. In addition, the metal front gasket covers the front end face and prevents the front end face from being exposed to the fluid conveyed into the pipeline.

In addition, based on the spherical coupling, the metal front gasket in the compression step is likely to make relatively small movements to enable the front face of the metal front gasket to adapt to the front end face.

In more detail, the metal front gasket comprises a front face configured to be placed in contact with the front end face, in particular the front face comprises, in succession, two flat surfaces that form a blunt angle between them. This conformation facilitates a limited plastic deformation of the end of the pipeline or of the hydraulic seal according to the corresponding hardness and guarantees the hydraulic seal and relative perfect adhesion.

In particular, the metal front gasket comprises a cylindrical inner face with a diameter less than or equal to the inner diameter of the pipeline. In this way, the whole surface of the front end face is protected from contact with the fluids conveyed by the pipeline.

In particular, the metal front gasket is made of one of the following materials: carbon steel, corrosion-resistant alloy for example Inconel, or Nickel with anti-corrosion coating.

In particular, the connector comprises a gripping mechanism and a support mechanism configured respectively to clamp the gripping portion to the pipeline and to apply radial forces directed towards the longitudinal axis to the outer face of the pipeline near the front end face.

The gripping mechanism serves to clamp the gripping portion and the whole connector to the pipeline: the gripping mechanism is secured to the gripping portion during the compression step of the metal front gasket by the linear actuators. The support mechanism has the function of preventing uncontrolled deformation of the free end of the pipeline during the compression of the front metal gasket against the front end face. In this case, the gripping mechanism and the support mechanism are operated by a plurality of linear actuators that apply a traction force parallel to the longitudinal axis.

In more detail, each linear actuator comprises a tie rod, at least in part threaded, and a nut that can be operated by hydraulically controlled devices. In this way, the forces can be precisely modulated, by hydraulic wrenches or jacks and turn nuts, and the desired configuration can be kept, once the pre-set position and the pre-set tightening force have been reached.

In addition, the hydraulic wrenches enable the direction of rotation to be reversed so that the coupling is reversible and the connector can be recovered.

In accordance with one embodiment, the gripping mechanism and the support mechanism are controlled independently by their respective linear actuators. In this way, the succession of operations can be optimised according to the circumstances.

In more detail, the support mechanism comprises annular sections that are mounted in sliding manner on the sleeve portion in the radial direction; a ring that is mounted in sliding manner in the axial direction with respect to the sleeve portion and that slides with respect to the annular sections along their respective inclined faces; and a thrust ring that is movable in the axial direction and connected to linear actuators. In this way, an axial force is transformed into a radial force.

In particular, the support mechanism comprises a radial gasket, which is placed between said ring and the thrust ring and is configured to radially expand as a result of compression between the ring and the thrust ring.

The radial gasket prevents any leaking through the metal front gasket from spreading along the outer face of the pipeline and circumscribes a chamber, in which a hydrocarbon can accumulate in the event of leaking through the metal front gasket in order to facilitate the detection of any leaks.

According to one embodiment of the disclosure, the connector comprises a channel that extends through the sleeve portion from an annular space near the metal front gasket to the outside of the connector. In this way, leaks can be detected through the metal front gasket.

The channel conveniently extends from an annular space delimited by the metal annular gasket and from the radial gasket.

In particular, the connector comprises a shield, which has a substantially cylindrical shape, is attached to the sleeve portion, and covers a portion of pipeline and the front metal front gasket. In this way, the shield defines a support for the gasket when connecting the connector to the pipeline and protects the front end face of the pipeline from contact with corrosive liquids.

In particular, the shield comprises a radial gasket, which extends between a seat in the shield and the inner face of the pipeline, in particular the radial gasket being expandable in a radial direction.

The radial gasket improves the seal between the shield and the pipeline. The gasket is expandable in a radial direction, compensating for any reduction in the thickness of the pipeline.

Another purpose of this disclosure is to provide a method of connection for a pipeline, in particular for the transport of hydrocarbons as an alternative to certain known methods.

According to this disclosure, a method of connection for a pipeline, in particular for the transport of hydrocarbons, is provided, the method comprising the following steps:

fitting a gripping portion of a connector around an outer face of a free end of a pipeline extending along a longitudinal axis;

clamping the gripping portion to the outer face of the pipeline; and compressing in a direction parallel to the longitudinal axis a metal front gasket between a front end face of the pipeline and a face of a sleeve portion, which is mounted in sliding manner with respect to the gripping portion parallel to the longitudinal axis.

In particular, the method involves penetrating the metal front gasket into the pipeline along the front end face.

In particular, the method involves applying radial forces directed towards the longitudinal axis along an outer face of the pipeline near the front end face and maintaining these forces while the metal front gasket is compressed.

In particular, the steps of clamping the gripping portion to the pipeline, compressing the metal front gasket, and applying the radial forces are carried out simultaneously. In this way, the connector and its drive are relatively simplified.

In accordance with an alternative embodiment, the step of applying radial forces is carried out independently of the steps of clamping the gripping portion to the pipeline and compressing the metal front gasket. In this way, you can choose the appropriate sequence of the step of applying radial forces with respect to the other steps of the method.

In particular, the method involves detecting the presence of fluid in an annular chamber placed around the metal front gasket. In this way, the relative effectiveness of the hydraulic seal can be tested.

BRIEF DESCRIPTION OF THE FIGURES

Further characteristics and advantages of this disclosure will become clear from the following description of non-limiting embodiments thereof, with reference to the figures in the accompanying drawings, wherein:

FIG. 4 is a cross-section view, with parts removed for clarity and on an enlarged scale, of a detail of the connector in FIG. 3;

FIG. 5 is a cross-section view, with parts removed for clarity and on an enlarged scale, of a variant of the connector in FIGS. 1 to 4;

FIG. 6 is a cross-section view, on an enlarged scale and with parts removed for clarity, of a detail of FIG. 4 or of FIG. 5;

DETAILED DESCRIPTION

Figure 1:
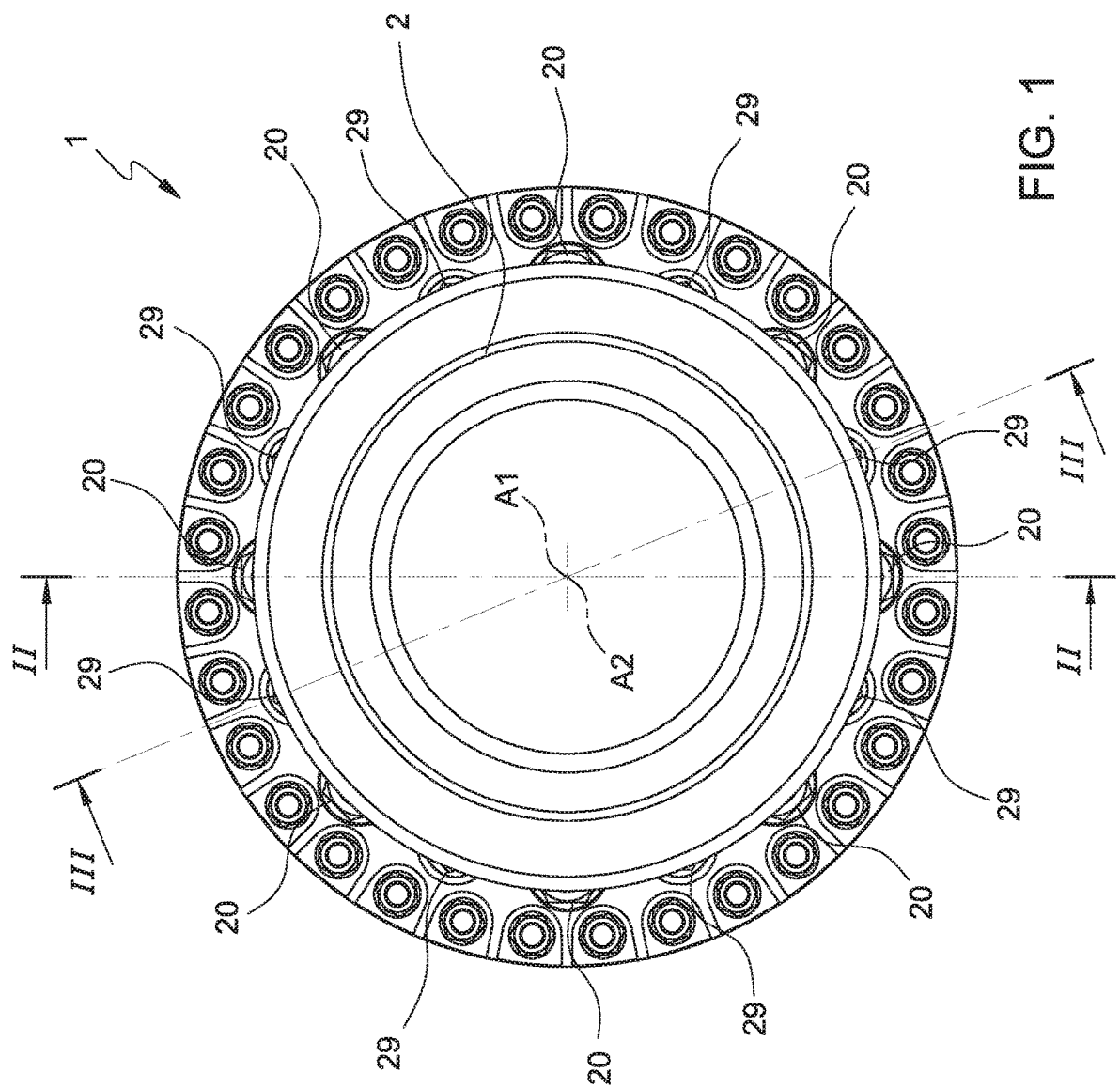
FIG. 1 is a front view, with parts removed for clarity, of a connector fitted around the end of a pipeline and made in accordance with this disclosure.

In FIG. 1, the reference number 1 denotes a connector, as a whole, which in the case shown is provided with a flange 2.

Figure 2:
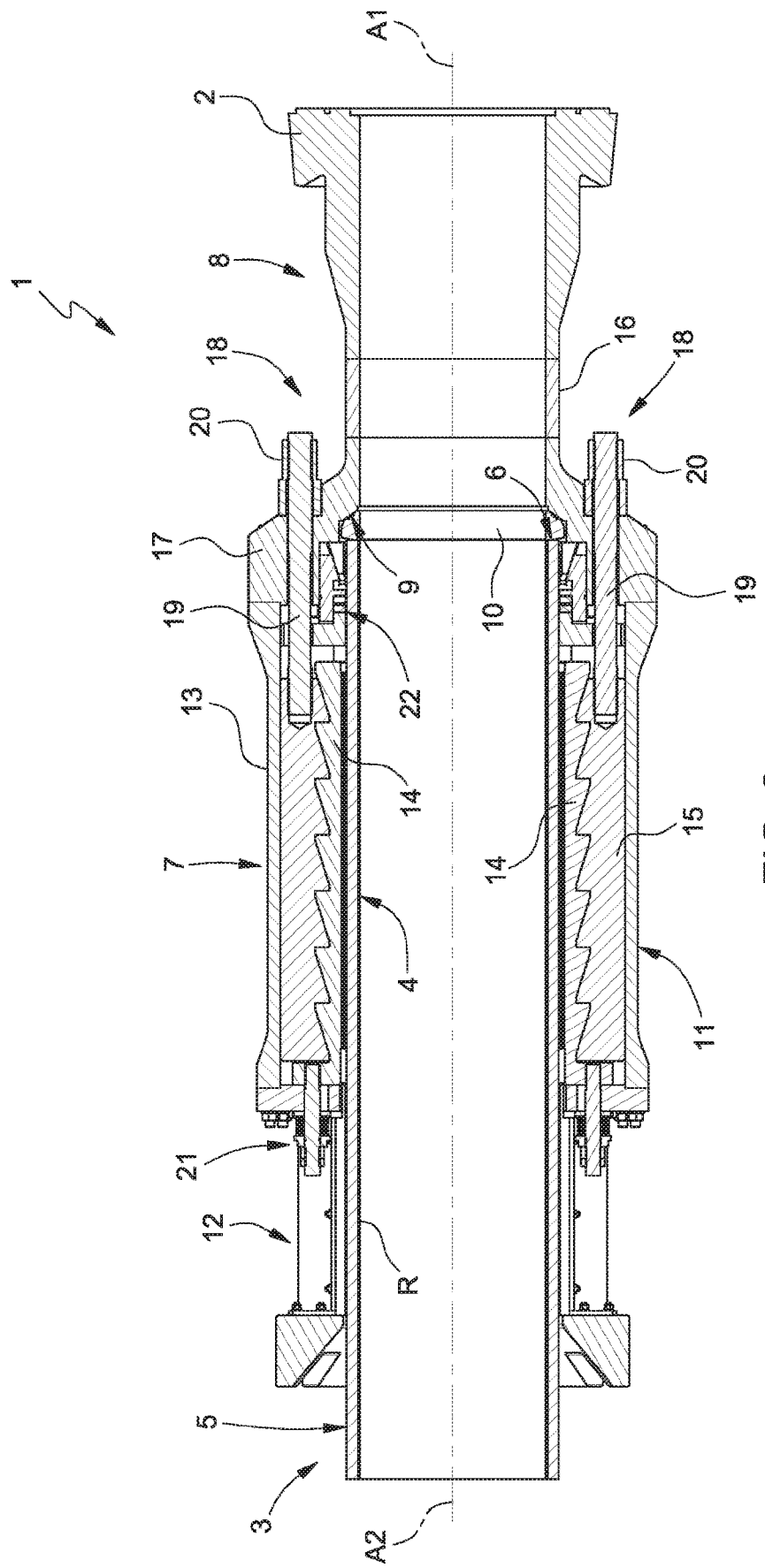
FIG. 2 is a longitudinal, cross-section view, with parts removed for clarity, of the connector in FIG. 1 along the section lines II-II.

With reference to FIG. 2, the connector 1 extends along a longitudinal axis A1 and is fitted around the end of a pipeline 3, which extends along a longitudinal axis A2 substantially coinciding with the longitudinal axis A1.

The pipeline 3 is cylindrical with a substantially circular transverse section and has an inner face 4, an outer face 5, and a front end face 6 extending from the inner face 4 to the outer face 5.

The pipeline 3 is made of steel and has a coating R that defines the inner face 4 and is made of metal alloys designed to withstand corrosive agents and joined to the wall with a metallurgical bond (cladding) or a mechanical bond (lining).

The connector 1 comprises a gripping portion 7 configured to fit around the outer face 5 of the pipeline 3; a sleeve portion 8, which is mounted in sliding manner with respect to the gripping portion 7, and has substantially the same inner diameter as the pipeline 3 and a face 9 facing the front end face 6, when the gripping portion 7 is fitted around the pipeline 2; and a metal front gasket 10 configured to be placed and compressed between the front end face 6 and the face 9 of the sleeve portion 8.

The gripping portion 7 comprises a gripping mechanism 11 configured to clamp the pipeline 3 and is connected to a guiding device 12, which is placed on the opposite side of the sleeve portion 8 and has the function of guiding the connector 1 along the pipeline 3 and centring the connector 1 on the pipeline 3.

The gripping portion 7 comprises a tubular frame 13, which is fixed to the guiding device 12; and the gripping mechanism 11, which is housed inside the tubular frame 13. In the case shown, the gripping mechanism 11 comprises a plurality of jaws 14, which are radially and axially guided to be selectively clamped to the pipeline 3. Each jaw 14 has, on the opposite side to the longitudinal axis A1, inclined faces alternated with annular faces.

The gripping mechanism 11 also comprises a tubular body 15, which has a succession of inclined faces and annular faces along the inner part, and is mounted in sliding manner along the tubular frame 13 so that the sliding of the tubular body 15 towards the sleeve portion 8 determines the tightening of the jaws 14 around the pipeline 3.

The sleeve portion 8 comprises a sleeve 16 with structural and dimensional features, at least as far as the internal diameter is concerned, substantially equal to that of the pipeline 3; the flange 2; and an annular body 17, which is coupled in an axially sliding way with the tubular frame 13.

The connector 1 comprises a plurality of linear actuators 18 uniformly distributed around the longitudinal axis A1 which are engaged with the gripping portion 7 and the sleeve portion 8 to bring the gripping portion 7 and the sleeve portion 8 axially closer together so as to compress the metal front gasket 10 between the front end face 6 of the pipeline 3 and the face 9 of the sleeve 10. This compression action of the metal front gasket 10 implies that the gripping portion 7 is clamped to the pipeline 2.

In the case shown, each linear actuator 18 comprises a tie rod 19, which is supported, so it can rotate, by the annular body 17 of the sleeve portion 8, and is engaged with the tubular body 15 of the gripping portion 7. Each linear actuator 18 comprises a respective nut 20, which is placed so it abuts against the annular body 17 and is engaged on one end of the tie rod 19, which is, at least in part, threaded. The nuts are driven in rotation by respective hydraulic wrenches or jacks configured to turn nuts. The driving of the linear actuators 18 determines the movement of the tubular body 15 towards the sleeve portion 8, the radial movement of the jaws 15 towards the pipeline 3 (that determines the clamping of the gripping portion on the pipeline 3), and the movement of the jaws 15 towards the sleeve portion 8. In the last step of the movement, the jaws 15 push the sleeve portion 8 towards the pipe 3, and the metal front seal 10 is compressed between the front end face 6 of the pipeline 3 and the face 9 of the sleeve portion 8.

Each jaw 14 is subjected to a traction force in the axial direction towards the guiding device 12 by a corresponding elastic mechanism 21 mounted on the tubular frame 13.

In practice, the linear actuators 18 determine both the clamping of the connector to the pipeline 3 and the compression of the metal front gasket 10.

Figure 3:
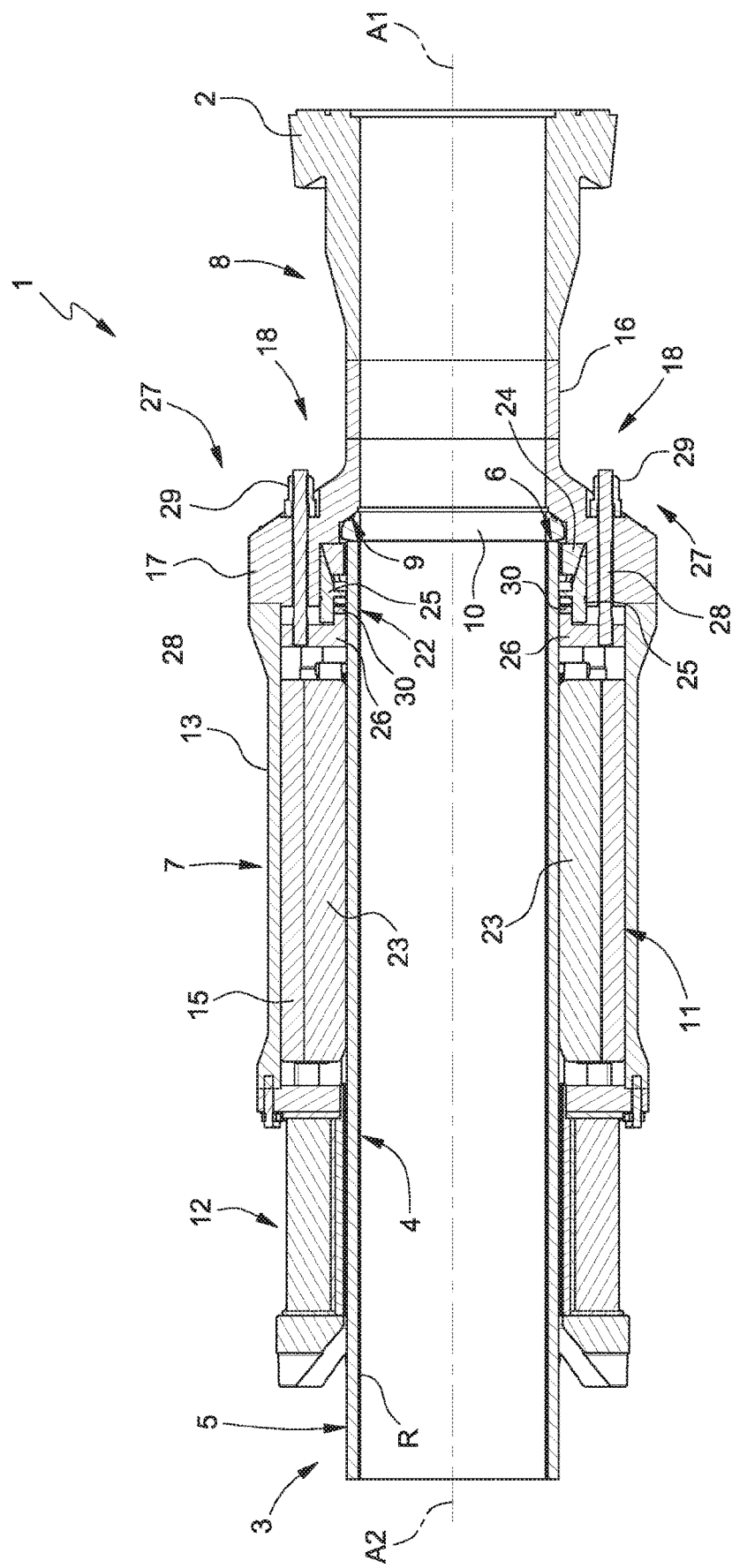
FIG. 3 is a longitudinal, cross-section view, with parts removed for clarity, of the connector in FIG. 1 along the section lines III-III.

With reference to FIG. 3, the connector 1 comprises a support mechanism 22, which is housed inside the tubular frame 13 and is configured to apply radial forces directed towards the longitudinal axis A1 along the outer face 5 of the pipeline 3 near the front end face 6.

FIG. 3 also shows two separators 23, which are alternated with the jaws 14, supported by the frame 13, and have the function of keeping the jaws 14 in place when the connector 1 is not fitted around the pipeline 3.

With reference to FIG. 4, the support mechanism 22 is housed, in part, in the tubular frame 13 and, in part, in an annular space in the annular body 17 and is facing the pipeline 2. The support mechanism 22 comprises a plurality of annular sections 24, which are uniformly distributed around the axis A1, face the outer face 5 of the pipeline 3 near the front end face 6 and are guided in a radial direction by the annular body 17; a ring 25 coupled with the annular sections 24 along their respective inclined faces and guided in an axial direction by the annular body 17; and a thrust ring 26.

The connector 1 comprises a plurality of linear actuators 27 uniformly distributed around the longitudinal axis A1 to operate the support mechanism 22. In the case shown, each linear actuator 27 comprises a tie rod 28, which is supported, so it can rotate, by the annular body 17 and is gripped by the thrust ring 26. Each linear actuator 27 comprises a corresponding nut 29, which is arranged so it abuts against the annular body 17 and is engaged with the tie rod 28 to determine the traction of the tie rod 28.

The mechanism 22 comprises a radial gasket 30, which is arranged in a housing delimited by the thrust ring 26, the ring 25, and the pipeline 3, and is expanded in a radial direction as a result of the compression between the thrust ring 26 and the ring 25.

The housing of annular sections 24 and the ring 25 is in communication with the outside of the connector 1 through a channel 31 in the annular body 17.

With reference to FIG. 6, the metal front gasket 10 is housed in an annular space in the annular body 17 and comprises a front face 32 facing the front end face 6, a face 33 configured to make a shape-coupling with the face 9 of the sleeve portion 8, and an inner face 34 that is cylindrical and substantially aligned with the inner face 4 of the pipeline 3.

In this illustrated embodiment, the front face 32 is formed from two flat portions that follow one another in a radial direction and form a blunt angle between them.

The face 33 of the metal front gasket 10 and the face 9 of the sleeve portion 8 form a spherical coupling.

The metal front gasket 10 is made of one of the following materials: carbon steel, Inconel, Nickel with anti-corrosion coating. The choice of the material of the metal front gasket 10 is determined by the material of the pipeline 3 and the material to make the connector 1.

The hardness of the metal front gasket 10 can be greater or less than that of the pipeline 3 so that, during the compression of the metal front gasket 10 on the end face of the pipeline 3, there is always a local plasticization of the pipeline 3 or of the metal front gasket 10.

In use, the connector 1 is fitted around the end of a pipeline 3 until the metal front gasket 10 abuts against the front end face 6 of the pipeline 3 as shown in FIGS. 2 and 3.

Then the linear actuators 18 are activated to clamp the connector 1 to the pipeline 3 by the gripping mechanism 11; other linear actuators 28 are activated to check the circularity of the free end of the pipeline 3 by the support mechanism 22; and the first linear actuators 18 are activated again to compress the front metal gasket 10 against the front end face 6 of the pipeline 3 until the front metal gasket 10 slightly penetrates into the front end face 6 of the pipeline 3 so as to locally, plastically deform the latter.

The plastic deformation can affect either the metal front gasket 10 or the pipeline 2 and depends on the respective hardness.

The tightening force applied by the linear actuators 18 and 27 can be modulated according to the maximum supply pressure of the corresponding hydraulic wrenches 20 and 29.

During the tightening step, the metal front gasket 10 adapts its position by virtue of the spherical coupling between the metal front gasket 10 and the annular body 10.

Once tightened, the pipeline 3 is filled with a pressurized fluid to test the tightness of the metal front gasket 10. If the pressurized fluid leaks through the metal front gasket 10, the liquid seeps through and is conveyed via the channel 31 and can be detected at the outlet of the channel 31 along the connector 1.

In accordance with the variant shown in FIG. 5, the second actuators 27 are omitted, and the first actuators 18 control the gripping mechanism 1I and the support mechanism 22 because, in accordance with this variant, the tie rods 19 are gripping both the tubular body 15 and the thrust ring 26. As a result, the connector 1 is relatively simpler to construct. In this case, the grip of the connector 1 on the pipeline 3, the tightening of the metal front gasket 10, the expansion of the radial gasket 30 and the application of the radial force of the support mechanism 22 are controlled by the nuts 20 that are operated by hydraulically controlled devices.

Figure 7:
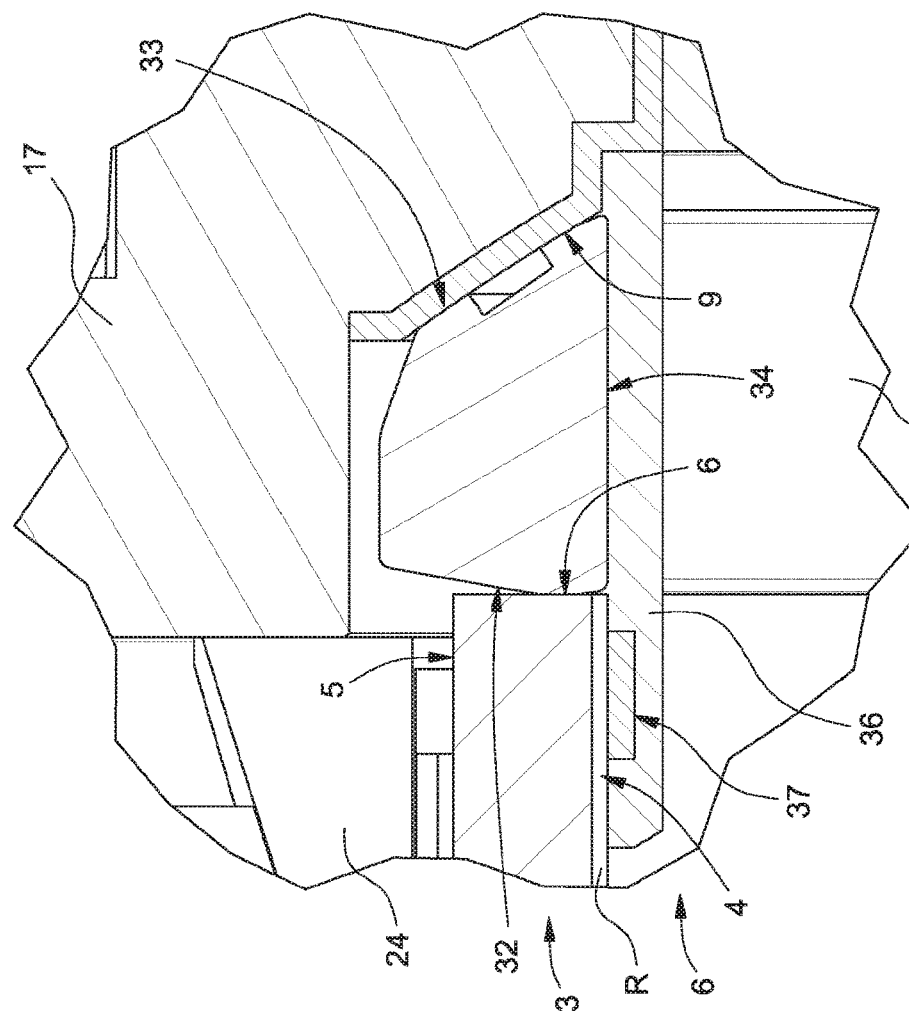
FIG. 7 is a cross-section view, on an enlarged scale and with parts removed for clarity, of a detail of a variant of the connector that is the subject of this disclosure.

In accordance with the variant in FIG. 7, the connector comprises a shield 36 of a substantially cylindrical shape that is attached to the sleeve portion 8. The shield 36 is made of corrosion-resistant steel and is fitted along the inner face 4 of the pipeline 3 and covers a portion of the pipeline 3 and the metal front gasket 10. The shield comprises a radial gasket 37, which extends between a seat in the shield 37 and the inner face of the pipeline 3.

Figure 8:
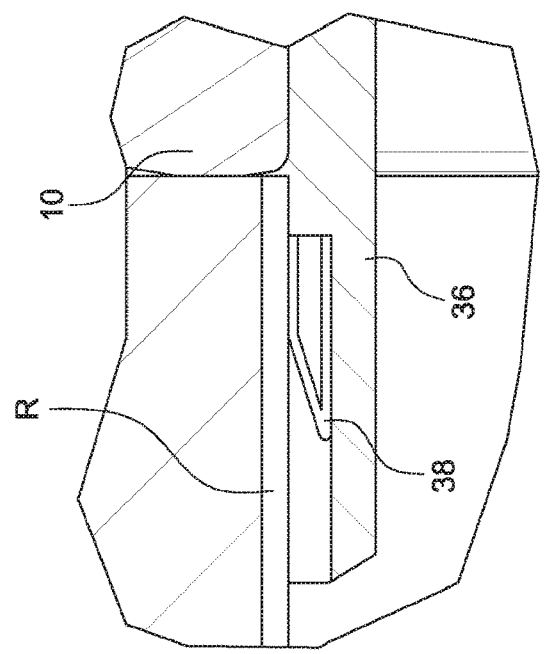
FIG. 8 is a cross-section view, on an enlarged scale and with parts removed for clarity, of a detail of an additional variant of the connector that is the subject of this disclosure.

With reference to the variant in FIG. 8, the shield 36 supports a radial gasket 38 of the expandable type, such as an elastic metal sheet that accumulates elastic energy during its insertion into the pipeline 2. This embodiment is particularly convenient when the pipeline 3 is very thick, which in FIG. 8 is indicated with R. When the extra thickness is consumed, the gasket 38 expands to recover any play caused by corrosion, at least partial, of the extra thickness R.

The present disclosure extends to additional variants which are not explicitly described and which fall within the scope of protection of the claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A pipeline connector comprising:
   a gripping portion configured to be fitted around and clamped to an outer face of a pipeline;
   a sleeve portion slidably mounted to the gripping portion and having a face facing a front end face of the pipeline when the gripping portion is fitted around the pipeline;
   a metal front gasket configured to be placed between the front end face of the pipeline and the face of the sleeve portion;
   a linear actuator connected with the gripping portion and the sleeve portion and configured to axially compress the metal front gasket between the front end face of the pipeline and the face of the sleeve portion;
   a gripping mechanism configured to clamp the gripping portion to the pipeline; and
   a support mechanism configured to apply radial forces directed towards a longitudinal axis to the outer face of the pipeline proximal the front end face of the pipeline, wherein the gripping mechanism and the support mechanism are independently controlled by respective linear actuators.

2. The pipeline connector of claim 1, wherein each linear actuator comprises an at least partially threaded tie rod and a nut configured to by operated by a hydraulically controlled device.

3. A pipeline connector comprising:
   a gripping portion configured to be fitted around and clamped to an outer face of a pipeline;
   a sleeve portion slidably mounted to the gripping portion and having a face facing a front end face of the pipeline when the gripping portion is fitted around the pipeline;
   a metal front gasket configured to be placed between the front end face of the pipeline and the face of the sleeve portion;
   a linear actuator connected with the gripping portion and the sleeve portion and configured to axially compress the metal front gasket between the front end face of the pipeline and the face of the sleeve portion; and
   a shield comprising a radial gasket configured to extend between a seat in the shield and an inner face of the pipeline, the shield having a cylindrical shape attached to the sleeve portion and configured to cover a portion of the pipeline and the metal front gasket.

4. The pipeline connector of claim 3, wherein the radial gasket is configured to expand in a radial direction.

5. A pipeline connector comprising:
   a gripping portion configured to be fitted around and clamped to an outer face of a pipeline;
   a sleeve portion slidably mounted to the gripping portion and having a face facing a front end face of the pipeline when the gripping portion is fitted around the pipeline;
   a metal front gasket configured to be placed between the front end face of the pipeline and the face of the sleeve portion;
   a linear actuator connected with the gripping portion and the sleeve portion and configured to axially compress the metal front gasket between the front end face of the pipeline and the face of the sleeve portion;
   a gripping mechanism configured to clamp the gripping portion to the pipeline; and
   a support mechanism comprising a plurality of annular sections slidably mountable on the sleeve portion in a radial direction, a ring slidably mountable in a axial direction with respect to the sleeve portion and with respect to the annular sections along a respective inclined face of each annular sector, and a thrust ring movable in the axial direction and connected to the linear actuators, the support mechanism configured to apply radial forces directed towards a longitudinal axis to the outer face of the pipeline proximal the front end face of the pipeline.

6. The pipeline connector of claim 5, wherein the gripping mechanism and the support mechanism are configured to be operated by a plurality of linear actuators.

7. The pipeline connector of claim 6, wherein each linear actuator comprises an at least partially threaded tie rod and a nut configured to by operated by a hydraulically controlled device.

8. The pipeline connector of claim 5, wherein the support mechanism comprises a radial gasket arranged between the ring and the thrust ring and configured to expand radially as a result of a compression between the ring and the thrust ring.

* * * * *